United States Patent
Goedegebuure et al.

(10) Patent No.: US 10,759,962 B2
(45) Date of Patent: Sep. 1, 2020

(54) METHOD FOR APPLYING RMA CROSSLINKABLE COATING ON MODIFIED EPOXY PRIMER COATING

(71) Applicant: ALLNEX NETHERLANDS B.V., Bergen Op Zoom (NL)

(72) Inventors: Rien Goedegebuure, Sint-Annaland (NL); Ferry Ludovicus Thys, Stevens-Woluwe (BE); Elwin Aloysius Cornelius Adrianus De Wolf, Hoogerheide (NL); Richard Hendrikus Gerrit Brinkhuis, Zwolle (NL); Michael Anthony Gessner, La Grange, KY (US); Antonius Johannes Wilhelmus Buser, Wehl (NL); David James Sauer, St. Matthews, KY (US)

(73) Assignee: Allnex Netherlands B.V., Bergen op Zoom (NL)

( * ) Notice: Subject to any disclaimer, the term of this patent is extended or adjusted under 35 U.S.C. 154(b) by 222 days.

(21) Appl. No.: 15/563,955

(22) PCT Filed: Apr. 18, 2016

(86) PCT No.: PCT/EP2016/058540
§ 371 (c)(1),
(2) Date: Oct. 3, 2017

(87) PCT Pub. No.: WO2016/166371
PCT Pub. Date: Oct. 20, 2016

(65) Prior Publication Data
US 2018/0163082 A1 Jun. 14, 2018

Related U.S. Application Data

(60) Provisional application No. 62/148,966, filed on Apr. 17, 2015.

(30) Foreign Application Priority Data

May 28, 2015 (EP) .................................. 15169717

(51) Int. Cl.
*B05D 1/02* (2006.01)
*B05D 3/02* (2006.01)
(Continued)

(52) U.S. Cl.
CPC ............. *C09D 167/02* (2013.01); *B05D 1/02* (2013.01); *B05D 3/0254* (2013.01); *B05D 3/102* (2013.01);
(Continued)

(58) Field of Classification Search
CPC .. C09D 167/02; C09D 17/008; C09D 163/00; B05D 3/102; B05D 3/0254; B05D 1/02;
(Continued)

(56) References Cited

U.S. PATENT DOCUMENTS 2,635,100 A 4/1953 Werntz
2,759,913 A 8/1956 Hulse et al.
(Continued)

FOREIGN PATENT DOCUMENTS

CN 86101015 A 8/1986
CN 1309683 A 8/2001
(Continued)

OTHER PUBLICATIONS

Brinkhuis, R.; Schutyser, J.; Thys, F.; De Wolf, E.; Buser, T.; Kalis, J.; Magnus, N.; Van Wijk, F. Taming the Michael Addition Reaction. European Coatings Journal 2015, 34-40. (Year: 2015).*
(Continued)

*Primary Examiner* — William P Fletcher, III
(74) *Attorney, Agent, or Firm* — Hoyng Rokh Monegier LLP; David P. Owen

(57) ABSTRACT

A method for applying a RMA crosslinked coating with improved adhesion, comprising the steps of applying on the substrate surface a layer of a modified epoxy primer comprising an epoxy functional polymer binder and a crosslinker, wherein adhesion of the RMA crosslinked coating to the epoxy primer layer is improved by said primer comprising after curing functional groups X reactable with crosslinkable components of the RMA crosslinkable composition or a precursor of functional groups X, preferably a moisture deblockable precursor. The invention also relates to modified epoxy primers, compositions for improving adhesion of epoxy primers and use thereof to improve adhesion of RMA crosslinkable coatings.

14 Claims, 1 Drawing Sheet

(51) Int. Cl.
| B05D 3/10 | (2006.01) |
| C09D 167/02 | (2006.01) |
| C09D 163/00 | (2006.01) |
| C08J 3/24 | (2006.01) |
| C08L 63/00 | (2006.01) |
| C08L 67/02 | (2006.01) |
| C09D 17/00 | (2006.01) |
| C08G 61/12 | (2006.01) |

(52) U.S. Cl.
CPC .............. $C08J\ 3/24$ (2013.01); $C08L\ 63/00$ (2013.01); $C08L\ 67/02$ (2013.01); $C09D\ 17/008$ (2013.01); $C09D\ 163/00$ (2013.01); $C08G\ 61/12$ (2013.01); $C08G\ 2261/135$ (2013.01); $C08G\ 2261/334$ (2013.01); $C08J\ 2367/02$ (2013.01); $C08L\ 2205/025$ (2013.01)

(58) Field of Classification Search
CPC ..... B05D 2504/00; B05D 7/544; C08L 67/02; C08L 63/00; C08L 2205/025; C08L 2367/02; C08J 3/24; C08G 2261/334; C08G 61/12; C08G 2261/135
See application file for complete search history.

(56) References Cited

U.S. PATENT DOCUMENTS

| 4,217,396 | A | 8/1980 | Heckles |
| 4,223,072 | A | 9/1980 | Baney et al. |
| 4,408,018 | A | 10/1983 | Bartman et al. |
| 4,529,487 | A | 7/1985 | Hsu et al. |
| 4,602,061 | A | 7/1986 | Akkerman |
| 4,749,728 | A | 6/1988 | Craun et al. |
| 4,851,294 | A | 7/1989 | Buter et al. |
| 4,871,822 | A | 10/1989 | Brindöpke et al. |
| 4,938,980 | A | 7/1990 | Arciszewski et al. |
| 5,017,649 | A | 5/1991 | Clemens |
| 5,084,536 | A | 1/1992 | Brindöpke et al. |
| 5,959,028 | A | 9/1999 | Brinkhuis |
| 5,973,082 | A | 10/1999 | Elmore |
| 5,990,224 | A | 11/1999 | Raynolds et al. |
| 6,201,048 | B1 | 3/2001 | Raynolds et al. |
| 6,262,169 | B1 | 7/2001 | Helmer et al. |
| 6,265,029 | B1 | 7/2001 | Lewis |
| 6,608,225 | B1 | 8/2003 | Larson et al. |
| 6,706,414 | B1 | 3/2004 | Dammann et al. |
| 6,878,845 | B2 | 4/2005 | Sheridan |
| 6,989,459 | B2 | 1/2006 | Walker |
| 7,524,435 | B2 | 4/2009 | Bernhard |
| 7,851,530 | B2 | 12/2010 | Brinkhuis et al. |
| 8,013,068 | B2 | 9/2011 | Beckley et al. |
| 8,124,688 | B2 | 2/2012 | Meijer et al. |
| 8,569,440 | B2 | 10/2013 | Spyrou et al. |
| 8,829,151 | B2 | 9/2014 | Meijer et al. |
| 8,962,725 | B2 | 2/2015 | Brinkhuis et al. |
| 9,181,452 | B2 | 11/2015 | Brinkhuis |
| 9,181,453 | B2 | 11/2015 | Brinkhuis |
| 9,260,626 | B2 | 2/2016 | Brinkhuis |
| 9,284,423 | B2 | 3/2016 | Brinkhuis |
| 9,534,081 | B2 | 1/2017 | Brinkhuis |
| 9,587,138 | B2 | 3/2017 | Brinkhuis et al. |
| 9,834,701 | B2 | 12/2017 | Brinkhuis et al. |
| 2003/0023108 | A1 | 1/2003 | Walker |
| 2003/0195305 | A1 | 10/2003 | Kuo et al. |
| 2004/0072979 | A1 | 4/2004 | Sheridan et al. |
| 2005/0137275 | A1 | 6/2005 | Nefzger et al. |
| 2005/0143575 | A1 | 6/2005 | Bernard |
| 2006/0078742 | A1 | 4/2006 | Kauffman et al. |
| 2007/0173602 | A1 | 7/2007 | Brinkman et al. |
| 2007/0299206 | A1 | 12/2007 | Cooper et al. |
| 2009/0143528 | A1 | 6/2009 | Mestach et al. |
| 2009/0226729 | A1* | 9/2009 | Niimoto ............ C08G 59/4007 428/416 |
| 2011/0003937 | A1 | 1/2011 | Kontani |
| 2011/0251338 | A1 | 10/2011 | Kim et al. |
| 2013/0053505 | A1 | 2/2013 | Brinkhuis et al. |
| 2013/0210986 | A1 | 8/2013 | Brinkhuis et al. |
| 2013/0317156 | A1 | 11/2013 | Yu |
| 2014/0088233 | A1 | 3/2014 | Kann |
| 2014/0221542 | A1 | 8/2014 | Brinkhuis et al. |
| 2014/0228507 | A1 | 8/2014 | Brinkhuis et al. |
| 2016/0115344 | A1 | 4/2016 | Brinkhuis et al. |

FOREIGN PATENT DOCUMENTS

| CN | 1637031 A | 7/2005 |
| CN | 1723242 A | 1/2006 |
| CN | 1757656 A | 4/2006 |
| CN | 1816597 A | 8/2006 |
| CN | 1910234 A | 2/2007 |
| CN | 1964997 A | 5/2007 |
| CN | 1976972 A | 6/2007 |
| CN | 101012291 A | 7/2007 |
| CN | 101012291 A | 8/2007 |
| CN | 101103060 A | 1/2008 |
| CN | 101107289 A | 1/2008 |
| CN | 101213230 A | 7/2008 |
| CN | 101268149 A | 9/2008 |
| CN | 101869844 A | 10/2010 |
| CN | 101879457 A | 11/2010 |
| CN | 102834436 A | 12/2012 |
| CN | 102834437 A | 12/2012 |
| CN | 103562328 A | 2/2014 |
| CN | 103974999 A | 8/2014 |
| DE | 835809 A | 4/1952 |
| DE | 835809 B | 4/1952 |
| DE | 3041223 A1 | 5/1981 |
| EP | 0161697 A1 | 11/1985 |
| EP | 0192304 A1 | 8/1986 |
| EP | 0198519 A1 | 10/1986 |
| EP | 0227454 A2 | 7/1987 |
| EP | 227454 A2 | 7/1987 |
| EP | 0161697 B1 | 3/1988 |
| EP | 0310011 A1 | 9/1988 |
| EP | 0310011 A1 | 4/1989 |
| EP | 0326723 A1 | 8/1989 |
| EP | 0448154 A1 | 9/1991 |
| EP | 0501223 A2 | 9/1992 |
| EP | 0651023 A2 | 5/1995 |
| EP | 0808860 A2 | 11/1997 |
| EP | 1541606 A1 | 12/2004 |
| EP | 1513900 A1 | 3/2005 |
| EP | 1541606 A1 | 6/2005 |
| EP | 1593727 A1 | 11/2005 |
| EP | 1761582 | 1/2006 |
| EP | 1513900 B1 | 2/2006 |
| EP | 1640388 A2 | 3/2006 |
| EP | 1641887 A1 | 4/2006 |
| EP | 1641888 A1 | 4/2006 |
| EP | 1838747 | 7/2006 |
| EP | 1761582 A1 | 3/2007 |
| EP | 1813630 A2 | 8/2007 |
| EP | 1838747 A1 | 10/2007 |
| EP | 1902081 A1 | 3/2008 |

(56) References Cited

FOREIGN PATENT DOCUMENTS

| | | |
|---|---|---|
| EP | 2072520 A1 | 6/2009 |
| EP | 1813630 B1 | 3/2010 |
| EP | 2374836 A1 | 4/2010 |
| EP | 1641887 B1 | 10/2010 |
| EP | 1902081 B1 | 12/2010 |
| EP | 2374836 A1 | 10/2011 |
| EP | 1641888 B1 | 2/2012 |
| EP | 2556108 A1 | 2/2013 |
| EP | 2556108 B1 | 7/2014 |
| EP | 2764035 A1 | 8/2014 |
| EP | 3085748 A1 * | 10/2016 ............... C09D 5/08 |
| GB | 2010879 A | 7/1979 |
| GB | 1596638 A | 8/1981 |
| GB | 2093472 A | 9/1982 |
| GB | 2010879 A | 7/1997 |
| GB | 2405149 A | 2/2005 |
| JP | 53141369 A | 12/1978 |
| JP | 62-223204 A | 10/1987 |
| JP | 01204919 A | 8/1989 |
| JP | H01204919 A | 8/1989 |
| JP | 8501124 A | 2/1996 |
| JP | 8319437 A | 12/1996 |
| JP | 1045993 A | 2/1998 |
| JP | H1045993 A | 2/1998 |
| JP | 10330690 A | 12/1998 |
| JP | H10330690 A | 12/1998 |
| JP | 200119353 A | 4/2000 |
| JP | 2001516789 A | 1/2001 |
| JP | 2001505948 A | 5/2001 |
| JP | 2001-207631 A | 8/2001 |
| JP | 2001516787 A | 10/2001 |
| JP | 2001516789 A | 10/2001 |
| JP | 2002514673 A | 5/2002 |
| JP | 2002285100 | 10/2002 |
| JP | 2002285100 A | 10/2002 |
| JP | 2003522817 A | 7/2003 |
| JP | 200418859 A | 1/2004 |
| JP | 2004018859 A | 1/2004 |
| JP | 2004211090 A | 7/2004 |
| JP | 2005-034687 A | 2/2005 |
| JP | 2005-505653 A | 2/2005 |
| JP | 2006-089743 A | 4/2006 |
| JP | 2006525402 A | 11/2006 |
| JP | 2011-099744 A | 5/2011 |
| JP | 2011-208371 A | 10/2011 |
| JP | 2013-091982 A | 5/2013 |
| JP | 2013-108339 A | 6/2013 |
| JP | 2013528670 A | 7/2013 |
| JP | 2014533948 A | 12/2014 |
| JP | 2015120769 A | 7/2015 |
| JP | 5910952 B2 | 4/2016 |
| KR | 100232793 B1 | 12/1999 |
| NL | 8203502 A * | 4/1984 ............ C09D 167/00 |
| RU | 2275403 C2 | 4/2006 |
| RU | 2346016 C2 | 2/2009 |
| RU | 2415167 C2 | 3/2011 |
| RU | 2484113 C2 | 6/2013 |
| RU | 2532909 C2 | 11/2014 |
| SG | 11201401321 W | 4/2013 |
| SG | 11201401321 A | 8/2014 |
| TW | 200613500 A | 5/2006 |
| WO | 94017148 A | 8/1994 |
| WO | 9641833 A1 | 12/1996 |
| WO | 9825989 A1 | 6/1998 |
| WO | 9914275 A1 | 3/1999 |
| WO | 9914278 A1 | 3/1999 |
| WO | 9914279 A1 | 3/1999 |
| WO | 9956608 A1 | 11/1999 |
| WO | 9958608 A1 | 11/1999 |
| WO | 0004106 A1 | 1/2000 |
| WO | 0112708 A | 2/2001 |
| WO | 0112708 A1 | 2/2001 |
| WO | 02053613 A1 | 7/2002 |
| WO | 2003031502 A | 4/2003 |
| WO | 03089479 A2 | 10/2003 |
| WO | 2004035632 A2 | 4/2004 |
| WO | 2004099329 A1 | 11/2004 |
| WO | 2005021672 A1 | 3/2005 |
| WO | 2005048866 A2 | 6/2005 |
| WO | 2005104694 A1 | 11/2005 |
| WO | 2005104694 A2 | 11/2005 |
| WO | 2006003044 A1 | 1/2006 |
| WO | 2006074895 A1 | 7/2006 |
| WO | 2006075000 A1 | 7/2006 |
| WO | 2006081079 A1 | 8/2006 |
| WO | 2007000335 A1 | 1/2007 |
| WO | 2007002328 A1 | 1/2007 |
| WO | 2007035255 A1 | 3/2007 |
| WO | 2008070022 A1 | 6/2008 |
| WO | 2008157468 A1 | 12/2008 |
| WO | 2011124663 A1 | 10/2011 |
| WO | 2011124664 A1 | 10/2011 |
| WO | 2011124665 A1 | 10/2011 |
| WO | WO-2011124665 A1 * | 10/2011 ........... C09D 167/02 |
| WO | 2012002095 A | 1/2012 |
| WO | 2012168385 A2 | 12/2012 |
| WO | 2012175622 A1 | 12/2012 |
| WO | 2013050574 A1 | 4/2013 |
| WO | 2013050622 A1 | 4/2013 |
| WO | 2013050623 A1 | 4/2013 |
| WO | 2013050624 A1 | 4/2013 |
| WO | WO-2013050624 A1 * | 4/2013 .......... B01J 31/0205 |
| WO | 2013071012 A2 | 5/2013 |
| WO | 2014125589 A | 8/2014 |
| WO | 2005021672 A1 | 10/2014 |
| WO | 2014166880 A1 | 10/2014 |
| WO | 2016054367 A1 | 4/2016 |
| WO | 2016166334 A1 | 10/2016 |
| WO | 2016166361 A1 | 10/2016 |
| WO | 2016166365 A1 | 10/2016 |
| WO | 2016166369 A1 | 10/2016 |
| WO | 2016166371 A1 | 10/2016 |
| WO | 2016166381 A1 | 10/2016 |
| WO | 2016166382 A1 | 10/2016 |
| WO | 2019145472 A1 | 8/2019 |

OTHER PUBLICATIONS

T. Jung et al.—Farbe und Lacke Oct. 2003.
The International Search Report of PCT/EP2012/069904.
Braun, D. et al., Polymer Synthesis: Theory and Practice, 4th ed., 2005, pp. 64-66.
Noomen, Arie: "Applications of Michael addition chemistry in coatings technology", Progress in Organic Coatings, (1997), pp. 137-142.
Krishnadas, Shashikiran et al., "Rapid Setting Epoxy Primer System with the Addition of Blocked Catalyst", Indian Journal of Advances in Chemical Science 2 (2014), pp. 55-60.
Lösungen, Römpp online 4.0, Mar. 1, 2002.
"The Basics of Airless Spraying, Information on Basic Components, Spray Techniques and Safety", 2014.
"ETPPAAc Solutions Ethyltriphenylphosphonium Acid Acetate", Apr. 20, 2007, pp. 1-2.
Priority search report for EP10159253.3 completed on Mar. 10, 2011.
International Search Report and Written Opinion for PCT/EP2011/055463 dated May 30, 2011 and International Preliminary Report on Patentability (Ch. II) for PCT/EP2011/055463 completed on Jun. 25, 2012.
International Search Report and Written Opinion for PCT/EP2011/055464 dated Jun. 7, 2011 and International Preliminary Report on Patentability (Ch. II) for PCT/EP2011/055464 completed on Jun. 18, 2012.
International Search Report and Written Opinion for PCT/EP2011/055465 dated May 10, 2011 and International Preliminary Report on Patentability (Ch. II) for PCT/EP2011/055465 completed Jun. 18, 2012.
Priority search report for EP11184388.4 completed on Jul. 26, 2012, International Search Report and Written Opinion for PCT/EP2012/069798 dated Jan. 16, 2013 and International Preliminary Report on Patentability (Ch. I) for PCT/EP2012/069798 dated Apr. 8, 2014.

(56) References Cited

OTHER PUBLICATIONS

Priority search report for EP11184439.5 completed on Aug. 9, 2012.
International Search Report and Written Opinion for PCT/EP2012/069906 dated Dec. 10, 2012 and International Preliminary Report on Patentability (Ch. I) for PCT/EP2012/069906 dated Apr. 8, 2014.
International Search Report and Written Opinion for PCT/EP2012/069904 dated Jan. 15, 2013 and International Preliminary Report on Patentability (Ch. I) for PCT/EP2012/069904 dated Apr. 8, 2014.
Priority search report for EP11184426.2 completed on Aug. 9, 2012, International Search Report and Written Opinion for PCT/EP2012/069905 dated Jan. 15, 2013 and International Preliminary Report on Patentability (Ch. II) for PCT/EP2012/069905 completed on Dec. 10, 2013.
Priority search report for EP13162819.0 completed on Feb. 19, 2014, International Search Report and Written Opinion for PCT/EP2014/056953 dated May 2, 2014 and International Preliminary Report on Patentability (Ch. I) for PCT/EP2014/056953 dated Oct. 13, 2015.
Priority search report for NL2014666 completed on Mar. 10, 2016, International Search Report and Written Opinion for PCT/EP2016/058427 dated Jul. 7, 2016 and International Preliminary Report on Patentability (Ch. I) for PCT/EP2016/058427 dated Oct. 17, 2017.
Priority search report for EP15169717.4 completed on Nov. 17, 2015.
International Search Report and Written Opinion for PCT/EP2016/058517 dated Aug. 1, 2016 and International Preliminary Report on Patentability (Ch. I) for PCT/EP2016/058517 dated Oct. 17, 2017.
International Search Report and Written Opinion for PCT/EP2016/058525 dated Jul. 13, 2016 and International Preliminary Report on Patentability (Ch. I) for PCT/EP2016/058525 dated Oct. 17, 2017.
International Search Report and Written Opinion for PCT/EP2016/058540 dated Jul. 18, 2016 and International Preliminary Report on Patentability (Ch. I) for PCT/EP2016/058540 dated Oct. 17, 2017.
Search report for NL2014667 completed on Feb. 11, 2016, with English machine translation.
Priority search report for EP15169719.0 completed on Nov. 3, 2015.
International Search Report and Written Opinion for PCT/EP2016/058588 dated Jul. 12, 2016 and International Preliminary Report on Patentability (Ch. I) for PCT/EP2016/058588 dated Oct. 17, 2017.
International Search Report and Written Opinion for PCT/EP2016/058590 dated Jul. 25, 2016 and International Preliminary Report on Patentability (Ch. I) for PCT/EP2016/058590 dated Oct. 17, 2017.
Priority search report for EP15169722.4 completed on Aug. 19, 2015 and International Search Report and Written Opinion for PCT/EP2016/058483 dated Jun. 9, 2016 and International Preliminary Report on Patentability (Ch. I) for PCT/EP2016/058483 dated Oct. 17, 2017.
Search report for NL2014668 completed on Feb. 11, 2016, with English machine translation.
U.S. Appl. No. 14/989,961 (now U.S. Pat. No. 9,587,138) filed on Jan. 7, 2016 (parent filing date Apr. 7, 2014).
JP Application No. 2014-533948 filed on Mar. 28, 2014 (effective filing date Oct. 8, 2012).
Noomen, Arie: "Applications of Michael addition chemistry in coatings technology", Progress in Organic Coatings, 32 (1997), pp. 137-142.
Lösungen, Römpp online 4.0, Mar. 1, 2002, with English machine translation.
"The Basics of Airless Spraying, Information on Basic Components, Spray Techniques and Safety", Graco, 2014.
Anonymus: "ETPPAAc Solutions Ethyltriphenylphosphonium Acid Acetate", Apr. 20, 2007, pp. 1-2.
AZO Materials, "A_Guide_to_Silane_Solutions_Adhesives", Sep. 7, 2012, Internet Article, https://www.azom.com/article.aspx?ArticleID=6777.

* cited by examiner

METHOD FOR APPLYING RMA CROSSLINKABLE COATING ON MODIFIED EPOXY PRIMER COATING

CROSS REFERENCE TO RELATED APPLICATIONS

This application is a 371 of PCT application number PCT/EP2016/058540 filed on Apr. 18, 2016, which claims priority from EP application number 15169717.4 filed on May 28, 2015, and U.S. application Ser. No. 62/148,966 filed on Apr. 17, 2015. All applications are hereby incorporated by reference in their entireties.

The invention relates generally to a method for applying a RMA crosslinked coating with improved adhesion. The invention further relates to a primer composition for use in the method, a composition for use in an epoxy primer for improving adhesion of a RMA crosslinkable coating to the epoxy primer.

RMA crosslinkable compositions are compositions comprising at least one crosslinkable component comprising reactive components A and B each comprising at least 2 reactive groups wherein the at least 2 reactive groups of component A are acidic protons (C—H) in activated methylene or methine groups (RMA donor group), and the at least 2 reactive groups of component B are activated unsaturated groups (C=C) (RMA acceptor group). These reactive groups react to achieve crosslinking by Real Michael Addition (RMA) reaction between said at least one crosslinkable components in the presence of a base catalyst (C).

Such RMA crosslinkable compositions are described in EP2556108. Herein a special catalyst C is described which is a substituted carbonate catalyst which decomposes in a coating layer to generate carbon dioxide which evaporates from the applied curing coating layer and a strong base which starts the RMA crosslinking reaction. The catalyst provides long pot-life and at the same time a high reactivity when applied as a coating layer where CO2 can escape.

The problem underlying the invention is that the RMA crosslinkable compositions may show undesirably poor adhesion properties in particular to polar surfaces for example in direct to metal applications unless the metal surface has been pretreated with a primer layer or with known metal pretreatments like silane treatment.

In the General Industrial, Marine, Protective, and ACE markets, topcoats are usually applied over an epoxy-amine primer. Adhesion studies of coatings based on RMA crosslinkable compositions were carried out over many different types of commercially available epoxy primers used in a wide field of end use applications including general industry, ACE and protective coatings. However, known epoxy primers do not always give good adhesion results for coatings based on RMA crosslinkable compositions.

Therefore the desire remains to more adequately improve the adhesion of RMA crosslinkable compositions, in particular coating compositions, in particular in pigmented coating compositions comprising the crosslinkable composition as the binder system for the coating and there is a need for adhesion promotors for improving the adhesion of RMA crosslinkable compositions

BRIEF SUMMARY OF THE INVENTION

According to the invention this problem has been solved by a method for applying a RMA crosslinked coating with improved adhesion, comprising the steps of I. providing an RMA crosslinkable composition comprising
   a) one or more crosslinkable components comprising a reactive component A with at least two acidic protons C—H in activated methylene or methine groups,
   b) a reactive component B with at least two activated unsaturated C=C groups and
   c) a catalyst C for catalyzing the RMA crosslinking reaction between components A and B,
   d) optional reactivity moderator D and
   e) optional organic solvent T,
II. applying on the substrate surface a layer of an epoxy primer comprising an epoxy functional polymer binder and a crosslinker, wherein adhesion of the RMA crosslinked coating to the epoxy primer layer is improved by said primer comprising after curing functional groups X reactable with crosslinkable component A or B of the RMA crosslinkable composition or a precursor of functional groups X, preferably a moisture deblockable precursor,
III. at least partial curing of the primer layer,
IV. applying, over the at least partially cured primer layer, a coating layer of the RMA crosslinkable composition and
V. curing the coating layer.

The inventors have found significant improvement of the adhesion to the epoxy primer layer and believe that to some extent crosslinkable components of the RMA crosslinkable composition will diffuse into the epoxy primer and react with functional groups X present in the modified epoxy primer creating a firm bond between the primer layer and the RMA crosslinked coating.

The epoxy primer can be formulated with excess amount of amine crosslinking groups relative to epoxy functional groups of the epoxy functional polymer and/or said epoxy primer is modified by addition of polyfunctional amine components or precursors thereof so that said primer layer after curing has free primary or secondary amine functional groups X or precursors thereof.

A preferred RMA crosslinkable composition comprises a crosslinkable component with components A being predominantly malonate or an acetoacetate and a crosslinkable component with components B being an acryloyl and the one or more functional groups X in the modified primer are reactable with malonate or acetoacetate and/or with the acryloyl, and preferably are primary or secondary amine.

The primer can be modified by addition to the primer of a polyfunctional compound comprising one or more functional groups X reactable with component A or component B of the RMA crosslinkable composition and also one or more groups chemically or physically binding with the epoxy functional binder or its crosslinker during or after curing, said one or more functional groups X being a primary or secondary amine, a thiol, isocyanate, epoxy or a RMA reactable component A' or B' or oligomers or polymers of components A' or B' which are same or different from the reactive components A and/or B in the RMA crosslinkable components.

In one embodiment the method comprises adding a RMA crosslinkable component comprising reactive component A, preferably malonate to the primer, preferably having a molecular weight Mw of at least 400, more preferably at least 700, 1000 or even 2000 dalton.

The polyfunctional compound comprising one or more functional groups X is preferably reactable both with component A or component B of the RMA crosslinkable composition and also chemically binding with the epoxy functional binder or its crosslinker.

In a particular preferred embodiment the epoxy primer is an epoxy resin modified with a polyfunctional moisture deblockable primary or secondary amine, preferably ketimine, aldimine or oxazolidine. These compounds react with water to form an amine. This has a further advantage that water present in the primer, RMA composition or adsorbed from the ambient is bound and cannot interfere with the curing reaction of both epoxy primer and RMA crosslinkable compositions.

The epoxy primer composition is modified by addition of polyfunctional compound in an amount not exceeding 20, 15, 10 or preferably 5 wt % relative to the total solids weight of the primer composition.

The primer can suitably be modified by a RMA crosslinkable component comprising reactive components A or B, preferably malonate or acetoacetate, most preferably a malonate, for example an adduct of TMP with acetoacetate or malonate triacetoacetate/malonate and/or a polyfunctional compound comprising a free primary or secondary amine functional group or precursor thereof, preferably moisture deblockable precursors thereof, preferably a polyfunctional ketimine, aldimine or oxazolidine or combinations or reaction products thereof.

The invention also relates to a primer composition for use in the method according to the invention comprising an epoxy functional binder, a crosslinker and a polyfunctional component as described above as adhesion promotor. Said polyfunctional component being reacted or reactable with the epoxy binder or its crosslinker in the primer curing conditions or is a separate non reacted component which is physically bonded in the cured primer.

The invention also relates to a composition for use in an epoxy primer for improving adhesion of a RMA crosslinkable coating on an epoxy primer layer, said composition comprising one or more primer adhesion improvers selected from a RMA crosslinkable component comprising reactive components A and or B, for example tri- or tetra-acetoacetate- or malonate or a crosslinkable component comprising reactive component B, in particular a tri- or tetraacrylate, a polyfunctional component comprising two or more free primary or secondary amine functional group or precursor thereof, preferably moisture deblockable precursors thereof, preferably a polyfunctional ketimine, aldimine or oxazolidine or combinations or reaction products thereof. The invention also relates to the use of the above composition for improving adhesion of a RMA crosslinkable coating on an epoxy primer layer.

BRIEF DESCRIPTION OF THE DRAWING

FIG. 1 illustrates chemical adhesion of RMA crosslinkable resins comprising acryloyl groups on epoxy-amine primers.

DETAILED DESCRIPTION OF THE INVENTION

Reference is made to EP2556108 and EP2764035 for detailed description of all components in the RMA crosslinkable composition A, B, C or D, their preparation, the amounts used in the RMA crosslinkable composition as well as for measurement methods and definitions and the description thereof is hereby incorporated by reference and applicable unless described otherwise herein. Most important features are described below in summary.

It is preferred that reactive component A is malonate or acetoacetate, preferably dominantly a malonate, and reactive component B is acryloyl. It is preferred that the one or more reactive components A in the crosslinkable component predominantly comprise one type of reactive components, predominantly meaning preferably more than 50, 75, 90 and most preferably 100% of the C—H reactive groups in crosslinkable component A are from one type of reactive component A, preferably from malonate or acetoacetate and most preferably consisting predominantly of malonate and acetoacetate or acetylacetone as the remainder component A. The most preferred component B is an acryloyl.

The reactive components A and B are preferably build into a polymer chain or pending or terminal pending on a polymer chain. Preferably, the one or more crosslinkable components are one or more polymers chosen from the group of polyesters, alkyds, polyurethanes, polyacrylates, epoxy resins, polyamides and polyvinyl resins which contain components A or B in the main chain, pendant, terminal or combinations thereof.

The one or more RMA crosslinkable components can be monomeric but preferably at least one crosslinkable component is a polymeric component with a weight average molecular weight Mw of at least 250 g/mol, preferably a polymer having Mw between 250, 300 and 5000, more preferably between 400 and 4000 or 500 and 3000 g/mol (as determined by GPC).

The relative amounts of the crosslinkable components in the RMA crosslinkable composition are chosen such that the molar ratio of activated unsaturated reactive group C═C in reactive component B to the activated acidic reactive groups C—H in reactive component A is between 0.5 and 2 and preferably between 0.75-1.5 or 0.8-1.2.

In case components D or P or both are present that comprise reactive groups X—H and can react with B, the molar ratio of activated unsaturated reactive group C═C in reactive component B to the total number of reactive groups C—H in reactive component A and reactive groups X—H in component D and P is between 0.3 and 3, preferably 0.5-2 and even more preferably 0.75-1.5 or 0.8-1.2.

In case a reactive solvent is present having 2 C—H reactive groups (for example malonate) then these are also included in the total amount of C—H in the above ratio as they are crosslinkable components. The total amount of monofunctional material should be limited otherwise it will negatively affect coating properties. Preferably the total amount monofunctional reactive solvent is less than 10, preferably less than 5, 3 or even 2 wt %.

The RMA crosslinkable composition preferably further comprises a reactivity moderator D comprising an X—H group that is also a Michael addition donor reactable with component B under the action of catalyst C, wherein X is C, N, P, O or S or an alcohol with 2 to 12 carbon atoms or both for improving open time and hence working time of application of the floor coating composition on a floor.

The X—H group in component D, preferably an N—H group containing component, has a pKa (defined in aqueous environment) of at least one unit, preferably two units, less than that of the C—H groups in predominant component A, preferably the pKa of the X—H group in component D is lower than 13, preferable lower than 12, more preferably lower than 11, most preferably lower than 10; it is preferably higher than 7, more preferably 8, more preferably higher than 8.5.

The component D preferably comprises a molecule containing the N—H as part of a group —(C═O)—NH—(C═O)—, or of a group —NH—(O═S═O)— or a heterocycle in which the nitrogen of the N=H group is contained in a heterocyclic ring preferably chosen from the group of a substituted or unsubstituted succinimide, glutarimide, hydantoin, triazole, pyrazole, immidazole or uracil, preferably chosen from the group of succinimides, benzotriazoles and triazoles.

The component D is present in an amount between 0.1 and 10 wt %, preferably 0.2 and 7 wt %, 0.2 and 5 wt %, 0.2 and 3 wt %, more preferably 0.5 and 2 wt % relative to the total amount of the crosslinkable components A or B and component D. The component D is present in such amount that the amount of X—H groups in component D is no more than 30 mole %, preferably no more than 20, more preferably no more than 10, most preferably no more than 5 mole % relative to C—H donor groups from component A present in the crosslinkable polymer.

The catalyst C can be preferably a carbon dioxide blocked strong base catalyst, more preferably a quaternary alkyl ammonium bi- or alkylcarbonate (as described in EP2556108). As this catalyst generates CO2 it is preferred for use in coating layers with a thickness up to 500, 400, 300, 200 or 150 micrometer.

A homogeneous base catalyst C, which is more suitable for thicker coating layers, are described in EP0326723 which is a catalyst consisting of the combination of a tertiary amine and an epoxide.

A preferred homogeneous catalyst C is a salt of a basic anion X— from an acidic X—H group containing compound wherein X is N, P, O, S or C, and wherein anion X— is a Michael Addition donor reactable with component B and anion X— is characterized by a pKa(C) of the corresponding acid X—H of more than two units lower than the pKa(A) of the majority component A and being lower than 10.5. Details of this catalyst are described in PCT/EP2014/056953, which is hereby incorporated by reference.

Other catalysts C that are especially useful in applications in which there is no large surface available for allowing C02 to evaporate such as in the case of thick films applications, have been described in WO2014166880A1.

In view of the fact that the RMA crosslinking reaction is base catalyzed, acidic components should not be used in the composition such that the acid base reaction between catalyst C and A and optionally D is not interfered. Preferably the composition is free of acidic components.

The RMA composition may comprise one or more organic solvents T required for dissolving certain components or for adjusting the RMA composition to an appropriate handling viscosity (eg for spraying application). Organic solvents for use in RMA crosslinkable compositions are common coating solvents that do not contain acid impurities like alkylacetate (preferably butyl or hexyl acetate), alcohol (preferably C2-C6 alcohol), N alkylpyrrolidine, glycolether, Di-propylene Glycol Methyl Ether, Dipropylene Glycol Methyl Ether, Propylene Glycol Methyl Ether Acetate, ketones etc.

The amount of volatile solvent can be between 0 and 60, 50 or 40 wt % but in view of QESH preferably the composition has a low volatile organic compounds (VOC) content and therefore the amount of volatile organic solvent is preferably less than 20, 15, 10, 5 and most preferably less than 2 or even 1 wt % relative to the total of the crosslinkable components A and B.

In particular where a low viscosity and a low VOC is required it is preferred that the RMA crosslinkable composition comprises one or more reactive solvents which react with crosslinkable components A or B. The one or more reactive solvents are preferably selected from the group of monomeric or dimeric components A, monomeric or dimeric components B, compounds A' having only 1 reactive acidic proton (C—H) in activated methylene or methine groups, compounds B having only 1 reactive unsaturated groups (C=C), most preferably alkylacetoacetates, dialkylmalonates, mono- or diacrylates of limited molecular weight. The total amount of volatile organic solvent plus reactive solvents is between 0 and 30 wt % and the volatile organic solvent is less than 5 wt % relative to the total weight of the RMA composition.

The modified epoxy primer suitable for use in the method of the invention is an epoxy primer which is modified to have, after curing, free amine groups. Good to excellent adhesion was found with these primers, which may be explained by chemical bond formation between remaining free amine groups on the primer substrate and acryloyl groups from the paint (see FIG. 1).

EXAMPLES

The following is a description of certain embodiments of the invention, given by way of example only.
Adhesion Test:
The results of adhesion stated in the following examples are based on the cross cut adhesion test following the ISO/DIN 2409, ASTM D3359 protocol. The ranking is briefly summarized as follows:
0: The edges of the cuts are completely smooth; none of the squares of the lattice is detached.
1: Detachment of small flakes of the coating at the intersection of the cuts. A cross-cut area not significantly greater than 5% is affected.
2: The coating has flaked along the edges and/or at the intersection of the cuts. A cross-cut area significantly greater than 5%, but not significantly greater than 15% is affected.
3: The coating has flaked along the edges partly or wholly in large ribbons, and/or it has flaked partly or wholly on different parts of the squares. A cross-cut area significantly greater than 15%, but not significantly greater than 35%, is affected.
4: The coating has flaked along the edges of the cuts in large ribbons and/or same squares have detached partly or wholly. A cross-cut area significantly greater than 335%, but not significantly greater than 65% is affected.
5: Any degree of flaking that cannot even be classified by classification 4.
Metal Substrate:
To test the adhesion of given examples and comparative examples films were applied on two types of metal substrates Gardobond 26S 6800 OC and Gardobond C. Gardobond© is a trade name of the German producer "Chemetall". Some example use aluminium substrates (Q-panel Al-46).
General Procedure for Mixing of the Formulations used for the Comparative Examples:
A malonate containing polyester as described below (paint A) was mixed with the DiTMPTA and the thinner n-propanol and stirred till a homogenous sample was obtained.
Prior to use all mentioned formulations were activated by adding the stated amount of initiator which is a tetrabutylammonium hydroxide TBAH solution reactively blocked with diethylcarbonate, with a base concentration of 0.928 meq/g solution (see procedure for preparation of initiator solutions). The initiator is also referred to herein as catalyst CAT4.

| Component | Catalyst CAT4 |
|---|---|
| Aqueous TBAH (55%) | 100 |
| Diethylcarbonate | 45.1 |
| n-propanol | 181 |

MPE1 Malonated Polyester

This resin is prepared as follows: into a reactor provided with a distilling column filed with Raschig rings were brought 382 g of neopentyl glycol, 262.8 g of hexahydrophthalic anhydride and 0.2 g of butyl stannoic acid. The mixture was polymerised at 240° C. under nitrogen to an acid value of 0.2 mg KOH/g. The mixture was cooled down to 130° C. and 355 g of diethylmalonate was added. The reaction mixture was heated to 170° C. and ethanol was removed under reduced pressure. Part the resin was modified by addition of succinimide as reactivity moderator; when the viscosity at 100° C. reached 0.5 Pa.s the material was cooled down to 140° and 11.2 grams of solid succinimide were added (MPE1S). This mixture was stirred until all succinimide was dissolved. Both resins were diluted with butyl acetate to 85% solids, to yield a material with OH value 16 mg KOH/g, GPC Mn 1750, and a malonate equivalent weight of 350 (active C—H EQW 175).

MA9 is a malonated alkyd using coconut oil as the oil component, an oil length of 30%, an OH value of 108 mg KOH/g, a GPC Mn of 1800 and a Mw of 4350. The malonate equivalent weight of this material is 360 (active C—H equivalent weight 180).

Paint Preparation

Paint D was prepared by mixing the components as described in Table 7 below. Paint D is based on MPE1, further comprising malonated TMP but no adhesion improver, and was tested on a primer of a ketimine modified epoxy primer paint (Ex 17).

TABLE 7 paint compositions

| Component | Paint D |
|---|---|
| MPE1 | 45.33 |
| Acetoacetate functional TMP | 1.89 |
| Miramer M300 | 18.17 |
| Acrylate functional IPDI trimer | 15.56 |
| Methyl amyl ketone | 18.89 |
| Silmer ACR-D2** | 0.09 |

**Silmer ACR-D2 is reactive silicone comprising multi-functional or linear-difunctional silicone pre-polymers with reactive terminal end groups being acrylates.

Catalyst Preparation Examples:

Catalyst compositions were prepared by mixing components specified in Table 8.

TABLE 8

Catalyst compositions

| Component | Catalyst 1 | Catalyst 4a |
|---|---|---|
| Aqueous TBAH (55%) | 100 | 0 |
| Methanolic TBAH 1M | 0 | 51.18 |
| Diethylcarbonate | 45.1 | 0 |
| Dimethylcarbonate | 0 | 8.6 |
| n-propanol | 181 | 0 |

TABLE 8-continued

Catalyst compositions

| Component | Catalyst 1 | Catalyst 4a |
|---|---|---|
| Geniosil GF 93 | 0 | 0 |
| Silquest A1120 | 0 | 0 |

TBAH is tetrabutyl ammonium hydroxide

Example 17

An epoxy paint, Aquapon 97-137 was activated with hardener 97-1200 at the volume ratio suggested by the producer (PPG) with an excess of epoxy groups and therefore no free amine groups. Then Setalux 10-1440, which is a ketimine functional resin, was added at a level of 5% by volume to the epoxy paint and thoroughly mixed and then applied onto a metal panel and dried for 24 hours. 18 grams of Paint D (having no adhesion improver) was mixed with 0.53 grams of Catalyst 1 and then sprayed onto the day-old primed panels, flashed for 10 minutes at room temperature and then baked for 15 minutes at 66° C. After cooling, adhesion was tested using the cross-cut adhesion test as described in ASTM D3359 and found to be very good.

Example 18

An epoxy paint, Aquapon 97-137 was activated with hardener 97-1200 at the volume ratio suggested by the producer (PPG) with an excess of epoxy groups and therefore no free amine groups. Then a ketimine prepared from reacting 1 mole of diethylenetriamine with 2 moles of methyl isobutyl ketone, was added at a level of 5% by volume to the epoxy paint and thoroughly mixed and then applied onto a metal panel and dried for 24 hours. 18 grams of Paint D was mixed with 0.53 grams of Catalyst 1 and then sprayed onto the day-old primed panels, flashed for 10 minutes at room temperature and then baked for 15 minutes at 66° C. After cooling, adhesion was tested using the cross-cut adhesion test as described in ASTM D3359 and found to be very good.

Comparative Example 13

An epoxy paint, Aquapon 97-137 was activated with hardener 97-1200 at the volume ratio suggested by the producer (PPG) with an excess of epoxy groups and therefore no free amine groups. The primer was then applied onto a metal panel and dried for 24 hours. 18 grams of Paint D was mixed with 0.53 grams of Catalyst 1 and then sprayed onto the day-old primed panels, flashed for 10 minutes at room temperature and then baked for 15 minutes at 66° C. After cooling, adhesion was tested using the cross-cut adhesion test as described in ASTM D3359 and found to be very bad. It shows that a paint without adhesion improver on this standard epoxy primer does not show sufficient adhesion, whereas modifying the epoxy primer according to the invention does result in good adhesion.

Example AA1

100 g of a commercially available epoxy primer was mixed with 10 g of TMPTAA (TMPtriacetoacetate). Next 6.6 g of part B (crosslinker) of the epoxy primer was added and mixed. The primer was spray applied to 2 phosphated steel panels. One panel was cured for 3 hours and the second panel was cured at 66° C. for 30 minutes. The primed panels were top coated with Paint B, which was catalyzed with CAT4. The panels were allowed to air dry for 7 days and then adhesion was tested using the cross-cut adhesion test as described in ASTM D3359 and found to be good. The test panels were then exposed in a condensing humidity cabinet set at 40° C. for 3 days and again adhesion was tested using the cross-cut adhesion test as described in ASTM D3359 and found to be good.

Example MAA1

100 g of a commercially available epoxy primer was mixed with 2 g of malonated alkyd MA9. Next 6.6 g of part B (crosslinker) of the epoxy primer was added and mixed. The primer was spray applied to 2 phosphated steel panels. One panel was cured for 3 hours at room temperature and the second panel was cured at 80° C. for 30 minutes. The primed panels were top coated with Paint B, which was catalyzed with CAT4. The panels were allowed to air dry for 7 days and then adhesion was tested using the cross-cut adhesion test as described in ASTM D3359 and found to be good. The test panels were then exposed in a condensing humidity cabinet set at 40° C. for 3 days and again adhesion was tested using the cross-cut adhesion test as described in ASTM D3359 and found to be good.

Example AMA1

100 g of a commercially available epoxy primer was mixed with 10 g of Miramer AS1000 (an amine acrylate ex Miwon). Next 6.6 g of part B of the epoxy primer was added and mixed. The primer was spray applied to 2 phosphated steel panels. One panel was cured for 3 hours at room temperature and the second panel was cured at 66° C. for 30 minutes. The primed panels were top coated with Paint B, which was catalyzed with CAT4. The panels were allowed to air dry for 7 days and then adhesion was tested using the cross-cut adhesion test as described in ASTM D3359 and found to be good. The test panels were then exposed in a condensing humidity cabinet set at 40° C. for 3 days and again adhesion was tested using the cross-cut adhesion test as described in ASTM D3359 and found to be good.

Example EMA1

100 g of a commercially available epoxy primer was mixed with 2 g of an epoxy functional malonated alkyd EMMR1. Next 6.6 g of part B (crosslinker) of the epoxy primer was added and mixed. The primer was spray applied to 2 phosphated steel panels. One panel was cured for 3 hours at room temperature and the second panel was cured at 80° C. for 30 minutes. The primed panels were top coated with Paint A, which was catalyzed with CAT4. The panels were allowed to air dry for 7 days and then adhesion was tested using the cross-cut adhesion test as described in ASTM D3359 and found to be good. The test panels were then exposed in a condensing humidity cabinet set at 40° C. for 4 days and again adhesion was tested using the cross-cut adhesion test as described in ASTM D3359 and found to be good.

Example MPEAA1

93.2 g of a commercially available epoxy primer was mixed with 4 g of MPE1. Next 6.4 g of part B (crosslinker) of the epoxy primer was added and mixed. The primer was spray applied to phosphated steel panels. The primed panels were top coated with Paint B, which was catalyzed with CAT4. The panels were allowed to air dry for 7 days and then adhesion was tested using the cross-cut adhesion test as described in ASTM D3359 and found to be good. The test panels were then exposed in a condensing humidity cabinet set at 40° C. for 3 days and again adhesion was tested using the cross-cut adhesion test as described in ASTM D3359 and found to be good.

Comparative Example NOA1

100 g of a commercially available epoxy primer was mixed with 6.6 g of part B (crosslinker) of the epoxy primer. The primer was spray applied to 2 phosphated steel panels. One panel was cured for 3 hours at room temperature and the second panel was cured at 80° C. for 30 minutes. The primed panels were top coated with Paint A, which was catalyzed with CAT4. The panels were allowed to air dry for 7 days and then adhesion was tested using the cross-cut adhesion test as described in ASTM D3359 and found to be good. The test panels were then exposed in a condensing humidity cabinet set at 40° C. for 4 days and again adhesion was tested using the cross-cut adhesion test as described in ASTM D3359: adhesion was found to be poor.

Preparation of EMMR1

A four-necked reaction flask equipped with a condenser; agitator; heating mantle; addition funnel; thermocouple attached to a control box; and primed Dean-Stark trap with toluene, was charged with 21.4 parts (by weight) of coconut fatty acid, 29.2 parts of trimethylol propane, 11.6 parts of phthalic anhydride, 0.07 parts of dibutyltin oxide, and heated under 0.5 SCFH (standard cubic feet per hour) (0.014 m3hr-1) nitrogen flow to 165° C. At 165° C., water started to distil azeotropically. The reaction temperature was increased to 230° C. and maintained at such temperature until an acid value <1.0 was attained. The alkyd was cooled to 110° C. To this resin, 30.9 parts of dimethyl malonate was added and the temperature was increased to 180° C. Minimum amount of toluene was added to distil methanol azeotropically. At 150° C., methanol started to distil out. The reaction temperature was kept at 180° C. to collect all the methanol. Once the ethanol stop coming, the reaction was cooled to 110° C. To this resin 20.2 parts of methyl epoxy soyate is added. The temperature increased to 180° C. Methanol started to distill out due to the transesterification of methyl ester at the chain end. The reaction was held at 180° C. to distill out all methanol. The nitrogen flow was increased to 2 SCFH (0.057 m3hr-1) to remove all the toluene while cooling. The epoxy functional malonated alkyd was filtered and stored. The resulting resin had 98% non-volatile material (NVM); density 9.40 lb/gallon, Gardener-Holdt viscosity of Z5-Z6, an acid value of 0.42; a number average molecular weight (Mn) of 2500; a weight average molecular weight (Mw) of 8500; and a polydispersity of 3.4.

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method for applying a RMA crosslinked coating, comprising the steps of:
   I. providing a RMA crosslinkable composition comprising:
      a) one or more crosslinkable components comprising a reactive component A with at least two acidic protons C—H in activated methylene or methine groups,
      b) a reactive component B with at least two activated unsaturated C=C groups, and
      c) a catalyst for catalyzing the RMA crosslinking reacting between components A and B;
   II. applying on a substrate surface a layer of an epoxy primer comprising an epoxy functional polymer binder and a crosslinker, said primer comprising after-curing functional groups X, reactable with the one or more crosslinkable components comprising a reactive component A or with the reactive component B of the RMA crosslinkable composition, or a precursor of the functional groups X;
   III. at least partially curing the primer layer;
   IV. applying, over the at least partially cured primer layer, a coating layer of the RMA crosslinkable composition; and
   V. curing the coating layer.

2. The method of claim 1 wherein the primer is an epoxy primer that is formulated with excess amount of amine crosslinking groups relative to epoxy functional groups of the epoxy functional polymer and/or said epoxy primer is modified by addition of an amine component comprising amine groups as the functional groups X or a precursor thereof so that said epoxy primer layer after curing has free primary or secondary amine groups as the functional groups X or a precursor thereof.

3. The method of claim 1, wherein the RMA crosslinkable composition comprises one or more crosslinkable components comprising a reactive component A, wherein the reactive component A is a malonate or an acetoacetate and the at least two activated unsaturated C=C groups in reactive component B are acryloyl groups and the one or more functional groups X are reactable with malonate or acetoacetate and/or with the acryloyl.

4. The method of claim 1 wherein the primer is modified by addition to the primer of a polyfunctional compound comprising one or more functional groups X reactable with the one or more crosslinkable components comprising a reactive component A or with the reactive component B of the RMA crosslinkable composition and also one or more groups chemically or physically binding with the epoxy functional binder or its crosslinker before, during or after curing, said one or more functional groups X being a primary or secondary amine, a thiol, isocyanate, epoxy or a RMA reactable component A' or B' or oligomers or polymers of components A' or B' which are same or different from the reactive components A and/or B in the RMA crosslinkable components.

5. The method of claim 1 wherein the epoxy primer is modified with a polyfunctional moisture deblockable primary or secondary amine.

6. The method of claim 5 wherein the epoxy primer composition is modified by addition of polyfunctional compound in an amount not exceeding 20 wt % relative to the total solids weight of the primer composition.

7. The method of claim 5, wherein the epoxy primer is modified with a polyfunctional ketimine, aldimine or oxazolidine.

8. The method of claim 1 wherein the epoxy primer is modified by addition to the epoxy primer before curing step III a polyfunctional compound being a polyfunctional RMA crosslinkable component comprising a reactive component A with at least two acidic protons C-H in activated methylene or methine groups, or a reactive component B with at least two activated unsaturated C=C groups and also one or more groups chemically or physically binding with the epoxy functional binder or its crosslinker before, during or after curing and/or a polyfunctional compound comprising a free primary or secondary amine functional group or precursor thereof.

9. The method of claim 8, comprising adding to the epoxy primer, before curing step III, a polyfunctional compound being an RMA crosslinkable component comprising a reactive component A or a reactive component B with at least two activated unsaturated C=C group, having a molecular weight Mw of at least 400, 700, 1000, or 2000 Dalton.

10. The method of claim 9 wherein the RMA crosslinkable component comprising a reactive component A comprises predominantly malonate as the reactive component A.

11. The method of claim 9 wherein the RMA crosslinkable component comprising a reactive component A comprises two or more acetoacetates as the reactive component A.

12. The method of claim 9 wherein the RMA crosslinkable component comprising a reactive component B comprising two or more acryloyl groups as reactive component B.

13. The method of claim 7, wherein the primer is modified by a triacetoacetate or a moisture deblockable precursor thereof.

14. The method of claim 1 wherein the primer comprises an adhesion promoter P having the general structure X-R-Y wherein R is an optional bridging group and Y is a functional group that reacts to the epoxy binder or its crosslinker during curing or is physically bonded to the epoxy binder after curing.

* * * * *